Aug. 28, 1962     O. H. HUSTON     3,051,892
ELECTROMAGNETIC WELL LOGGING SYSTEMS
Filed Sept. 6, 1957     2 Sheets-Sheet 1
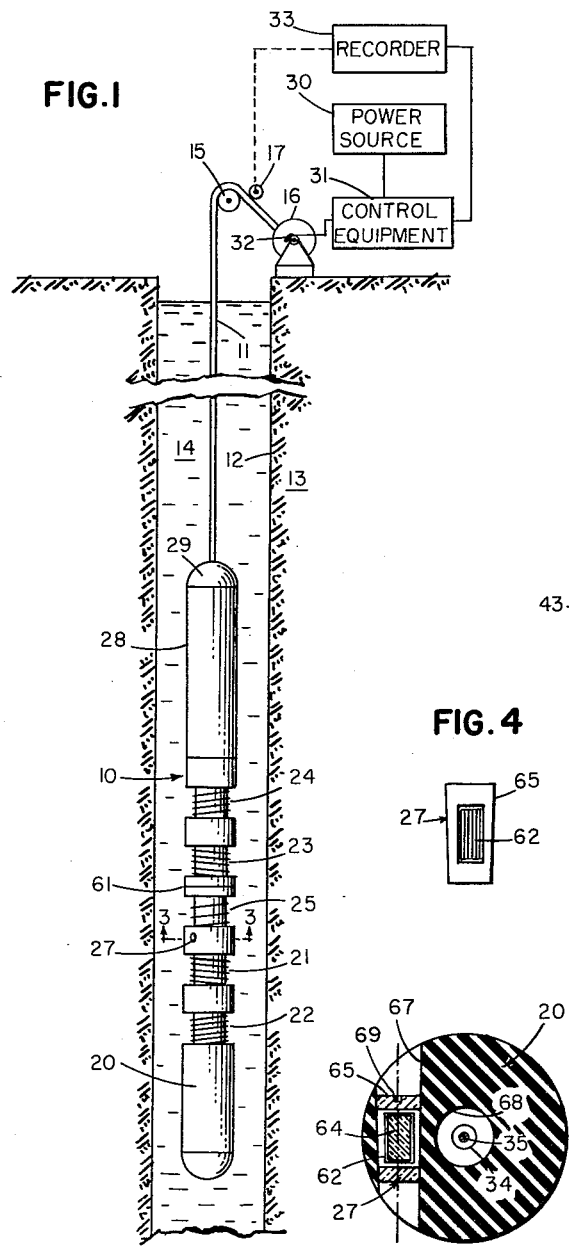
FIG.1
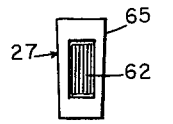
FIG.4
FIG.3
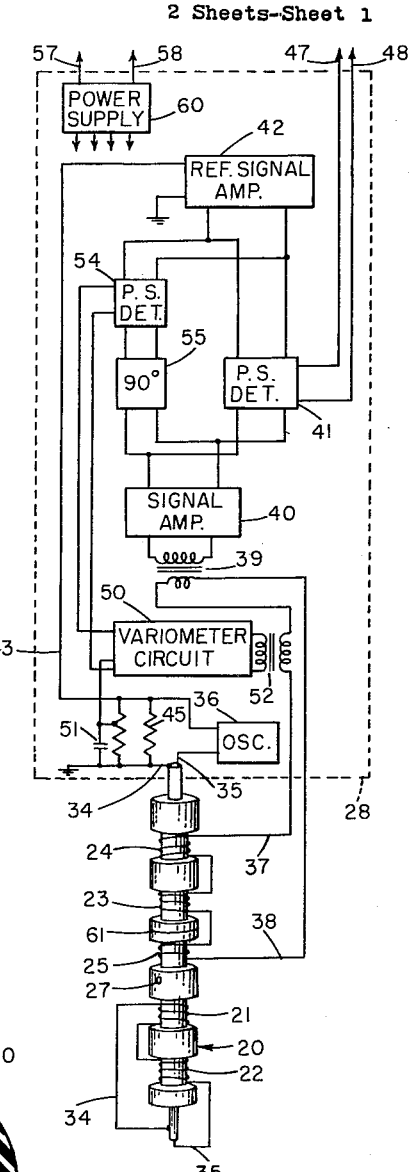
FIG.2
INVENTOR.
OWEN H. HUSTON
BY *William R. Sherman*
ATTORNEY

3,051,892
ELECTROMAGNETIC WELL LOGGING SYSTEMS
Owen H. Huston, Houston, Tex., assignor to Schlumberger Well Surveying Corporation, Houston, Tex., a corporation of Texas
Filed Sept. 6, 1957, Ser. No. 682,441
19 Claims. (Cl. 324—6)

The present invention relates to apparatus for investigating earth formations traversed by a borehole and, more particularly, to electromagnetic well logging systems arranged for accurately deriving indications of the conductivity or resistivity of such formations.

Widespread use is currently made of induction logging systems to determine the electrical conductivity of earth formations traversed by a well. In such systems, a coil array is passed through the well comprising transmitter coil means disposed in fixed relation to receiver coil means for inductive coupling therewith. The transmitter coil means is energized by sinusoidal current, and the magnitude of a signal component having the same phase as the energizing current is detected in the output of the receiver coil means. Such systems are rendered highly effective in the accurate determination of earth conductivities by the employment of focussing coil techniques of the type disclosed in Patents Nos. 2,582,314 for "Electromagnetic Well Logging System" and 2,582,315 for "Differential Coil System for Induction Logging," both issued January 15, 1952, to Henri-Georges Doll.

For accurate conductivity determinations, such systems are commonly arranged for minimizing the reactive or phase quadrature component of the receiver coil signal so that the in-phase or conductive component of the receiver coil signal may more readily be detected. One manner in which the reactive component is effectively reduced is by placement of a compensating coil at a fixed position intermediate the transmitter and receiver coils and connected in series with one of such coils. This arrangement has proved to be satisfactory in commercial operations, but the presence of the compensating coil sometimes leads to a resultant conductive signal independent of the presence of conductive bodies in the vicinity of the coil array. The sense of the residual conductive component may either be positive, where a positive polarity corresponds with an indication of conductive formations, or of negative polarity. Furthermore, a coil array which originally exhibits substantially a zero residual signal may, after subjection to high temperatures and pressures encountered in boreholes, exhibit a measurable residual signal of either polarity. While such residual signals may be balanced out electrically for each operation, there remains the possibility of human error in adjusting the magnitude and polarity of the potential required for proper balancing before each operation is commenced.

Accordingly, it is an object of the present invention to provide new and improved induction well logging apparatus of the above character which may be maintained free of any residual signal without the necessity of electrical balancing.

Another object of the invention is to provide new and improved induction well logging apparatus of the foregoing character which may readily be maintained highly accurate under adverse field conditions.

A further object of the invention is to provide new and improved well logging apparatus of the foregoing character by which highly accurate indications of formation conductivity may be secured substantially free from risks of human error.

In accordance with the present invention, transmitter and receiver coils are supported by an elongated mandrel whereby a potential is induced in the receiver coil in response to energization of the transmitter coil. To enhance the accuracy of indications obtained as a function of the in-phase component of the induced potential, an adjusting element is movably supported by the mandrel to introduce a signal component into the response of the coil array which may be readily varied to correct the zero of the response. In a preferred form, the adjusting element is a tapered plug carrying a short circuited resistance and supported by the mandrel for rotation about an axis transverse thereto so as to vary its inductive coupling with the transmitter, receiver and compensating coils. In order that the residual conductive signal (the in-phase signal derived when in non-conductive region) may be adjusted substantially to zero, the coil array is constructed with a given residual signal of one polarity, while the adjusting element is placed along the mandrel where the response of the coil array to its presence is of opposite polarity sufficient in the mean effective condition of the adjusting element to balance out the given residual signal.

For a better understanding of the invention, reference is made to the following detailed description of a representative embodiment, taken in conjunction with the accompanying drawings in which:

FIG. 1 is a schematic diagram of induction logging apparatus in accordance with the invention;

FIG. 2 is a schematic diagram showing a typical circuit arrangement for the apparatus of FIG. 1;

FIG. 3 is an enlarged cross sectional view taken along the line 3—3 of FIG. 1;

FIG. 4 is a side elevaitonal view of the adjusting element which may be employed with the apparatus of FIG. 1.

Figure 5:
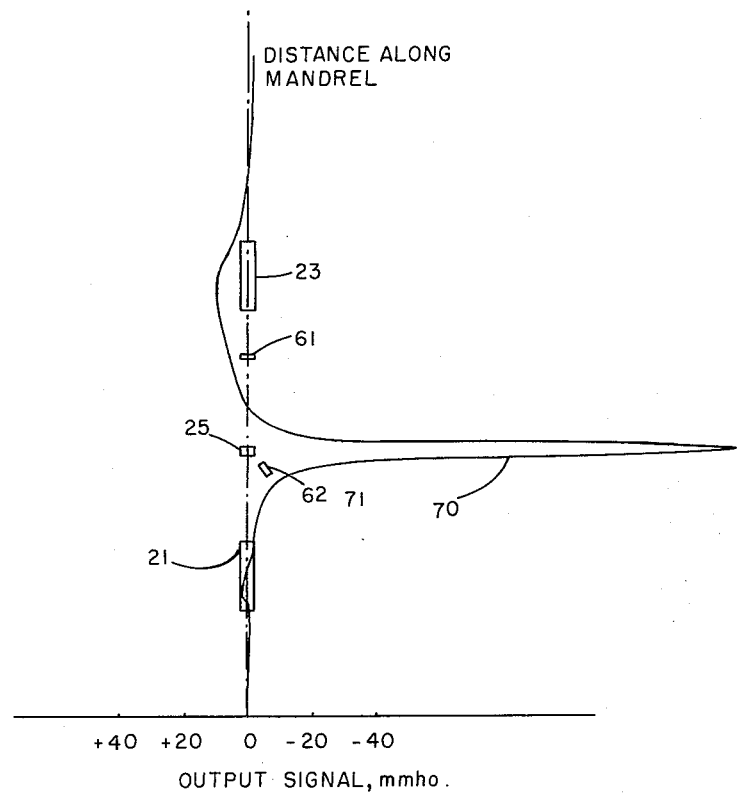
FIG. 5 is a graphical representation of the variation in response of the apparatus of FIG. 1 with placement of the adjusting element along its coil array.

In FIG. 1 a typical induction logging sonde 10 is shown suspended by means of an electric cable 11 in a bore hole 12 traversing earth formations 13. The borehole 12 may be dry or it may contain a relatively conductive or non-conductive drilling fluid 14. The cable 11 may pass over a sheave 15 suspended above the well and terminate on the drum of a winch 16 by which it may be raised or lowered in the well. The level of the sonde 10 in the well may be determined at all times by applying a measuring wheel 17 to the cable 11.

To provide inductive coupling with the adjacent formations, the sonde 10 may suitably comprise a non-conductive, non-magnetic mandrel 20 about which is wound a plurality of electrostatically shielded coils including, for example, a main transmitter coil 21, a transmitter focussing coil 22 therebelow, a main receiver coil 23 above the transmitter coils, a receiver focussing coil 24 thereabove, and also a compensating coil 25 spaced above the transmitter coils and below the receiver coils. Above, below and intermediate the coils, the mandrel 20 may be enlarged to retain the coils in fixed longitudinal spacings, such as are described in the abovementioned patents to Henri-Georges Doll, to form a coil array with a substantially zero mutual inductance.

In order that the residual conductive component (that is, the conductivity signal which is picked up when the sonde is out of the borehole and away from conductive material) may have a desired value, such as substantially zero, there is positioned along the mandrel an adjusting element 27 to be described more particularly hereafter.

Electrically and physically connected to the coil assembly is a pressure-resistant cartridge 28 which may contain the borehole portions of the electronic equipment employed in the operation of the logging system. Fluid-tight connections between circuitry in the cartridge 28 and the cable 11 are effected by a head 29.

At the surface, a power source 30 is coupled through suitable control equipment 31 to the upper ends of cable conductors via slip rings 32. The measure signal derived from the induction logging tool 10 in response to energization by the power source 30 is coupled via slip rings 32 and the control equipment 31 to a suitable recorder 33, such as a galvanometric recorder of the type conventionally employed in well logging operations. While the measure signal derived from the induction logging sonde is directly representative of formation conductivity, a conventional reciprocator may be included in the control equipment 31 so that both a curve of formation conductivities and a reciprocated curve of formation resistivities may be recorded by separate channels of the recorder 33. Where reference is made to indications of formation conductivity, therefore, it will be understood that such indications also are representative of formation resistivities in accordance with a reciprocal relationship.

As seen in FIG. 2, the main transmitter coil 21 and transmitter focussing coil 22 are connected in series opposition by conductors 34, 35 with a source of sinusoidal current, such as oscillator 36 disposed in the cartridge 28. The main receiver coil 23 is similarly connected in series opposition with both the receiver focussing coil 24 and the compensating coil 25 by conductors 37, 38. These conductors apply the receiver coil signal via input transformer 39 to a signal amplifier 40.

The circuitry employed within the cartridge 28 for deriving a signal representative of formation conductivity may have widely varying forms. Thus, for example, the circuitry may be as shown and described in W. J. Sloughter application Serial No. 611,019 filed September 20, 1956, for "Electromagnetic Well Logging Systems" or in M. A. Coufleau application Serial No. 619,900 filed November 1, 1956, for "Well Logging Systems."

In the exemplary circuit shown in FIG. 2, the signal amplifier 40, which may be of a conventional, feedback-stabilized design, has its output coupled to the signal input terminals of a phase sensitive detector 41. This detector serves the purpose of selectively and linearly detecting the conductive component of the signal induced in the receiver coil array, and of rejecting the phase quadrature component. In order to polarize the detector 41 at the phase angle of the conductive component, its reference signal input terminals are coupled to the output of a reference signal amplifier 42, which, in turn, is supplied via conductor 43 and phase correcting network 51 with an input signal corresponding to the potential developed across resistor 45 in series with the transmitter coils. Hence, the reference or sensitizing signal supplied to the phase sensitive detector 41 is accurately in phase correspondence with the transmitter coil energizing current. The output terminals of detector 41 are connected by cable conductors 47, 48, with the recorder 33 at the surface via the slip rings 32 and control equipment 31.

The phase sensitive detector 41 may have a variety of suitable designs, one such design being shown in vol. 19 of the Radiation Laboratory Series entitled "Waveforms" by Chance et al. at pages 522–523 (published in 1949 by McGraw-Hill Book Company, New York). While detectors of this type are highly selective, being capable of rejecting an undesired signal component of substantial magnitude relative to the desired signal component, the selectivity of the circuit may be enhanced in the manner disclosed in Patent No. 2,788,483 for "Phase Rejection Networks," issued April 9, 1957, to Henri-Georges Doll. Thus, a "variometer" circuit 50 of the type disclosed in the Doll patent may have its input coupled via phase correction network 51 with the series resistor 45 and its output coupled by transformer 52 in series opposition with the receiver coil 23.

While the variometer circuit 50 may be of the type described in H. G. Doll Patent No. 2,788,483, it may also conveniently be of the form shown and described in the abovementioned Sloughter application Serial No. 611,019.

To determine the magnitude of the opposing signal introduced by transformer 52, the reactive component of the signal amplifier output is detected by a phase sensitive detector 54 having its signal input coupled via a 90° phase shifting circuit 55 with the output of the signal amplifier 40 and its reference signal input coupled with the output of the reference signal amplifier 42. The phase sensitive detector 54 may be of any suitable design. However, as the reactive component is to be reduced substantially by the operation of the variometer circuit, a very sensitive and stable detector circuit may be desired of the type described at pages 254–255 of the "Review of Scientific Instruments," vol. 22, April 1951, in an article entitled "A Phase-Sensitive Detector Circuit Having High Balanced Stability" by N. A. Schuster. This circuit has a balanced input and output, the output being coupled in the present system to the gain control input terminals of variometer circuit 50.

Cable conductors 57, 58 connect a power supply 60 in the cartridge with the power source 30 to provide suitable energization of the cartridge circuitry.

The circuitry coupled with the receiver coil is thus highly sensitive to the phase of the induced signal for selective response to the conductive component representing formation conductivities. A residual response may, therefore, be introduced by relatively small spurious phase shifts in the coil assembly, such as may arise from the finite resistance or distributed capacitance of the conductors forming the coils or coil connections and from certain metal parts which may be present in the design of a practical device. In general, the residual signal obtained may vary both positively and negatively, corresponding with an apparent increase or decrease in the measured formation conductivity.

According to the present invention, the coil assembly is deliberately constructed so as to introduce a constant component into the residual signal having a predetermined value and a given polarity, say positive, independent of formation conductivity. The residual signal from the coil assembly may, of course, vary about this predetermined value, but the predetermined value is chosen to be sufficiently large that, absent the adjusting element 27, the residual signal always has the same given polarity. The adjusting element 27 may then be arranged with the capacity to balance out approximately twice this constant residual signal component. The final residual signal is then brought substantially to zero by varying the adjusting element 27 about the middle of its range, the mid-range setting serving to nullify the deliberately introduced residual signal component of constant value, and adjustments on either side of mid-range serving to cancel positive and negative departures of the residual signal from the predetermined value.

In this way an adjusting element having a variable effect of one polarity may be utilized to effect corrections in the residual signal of either polarity.

The constant residual signal component of predetermined value and given polarity may be introduced by means of a single-turn shorted loop 61 of relatively low resistance wire extending completely around the circumference of the mandrel 20. While the loop 61 may be positioned at any one of various points along the mandrel, it is illustrated as secured about the enlargement of the mandrel intermediate the receiver coil 23 and compensating coil. The loop 61 may be composed of No. 22 copper wire and have an inductance at a temperature of 75° C., about twice its resistance. Conveniently, it is welded or soldered in the form of a closed loop to fit tightly within an underlying groove in the mandrel.

In this form of the loop 61, a positive residual signal representing, say, the equivalent of 8 mmho is obtained. However, the positive residual signal introduced may increase to, say, 10 mmho as the sonde is lowered into the high temperature environment of a borehole, this increase serving to offset or compensate for an undesired drift of the conductivity signal occasioned by the rise in temperature of the coil assembly. Thus, the loop 61 serves a dual function of biasing the residual signal toward a given polarity and affording temperature drift compensation.

The adjusting element 27, as seen in FIGS. 1 and 2, may conveniently be located in the enlargement of the mandrel 20 intermediate the main transmitter coil 21 and compensating coil 25. The adjusting element 27 is arranged to provide a circuit of high resistance, relative to its reactance, inductively coupled to an adjustable extent with the transmitter and receiver coils. To provide the inductively coupled circuit, conducting material having a high resistance, and preferably of non-magnetic character, is incorporated in the adjusting element. Conveniently, the circuit is arranged as a generally planar closed-loop coil 62 consisting of a suitable number of turns of high resistance wire. Preferably the composition of the wire has a low temperature coefficient, so that its resistance does not change over the wide ranges of temperatures encountered in boreholes. Thus, the wire may be composed of Magnanin or Constantin, for example.

The configuration of the coil 62 is fixed by winding the coil on a transverse portion 64 of a rotatable plug 65. As seen in the cross sectional view of FIG. 3, which is taken through the plane of the coil 62, the transverse portion 64 of plug 65 may have a generally rectangular cross section elongated in the direction of the axis of the plug, the plug having a generally tapered or frusto-conical configuration. If desired, the coil 62 may be covered with an encapsulating material, such as a plastic, conforming to the configuration of the plug.

To receive and retain the plug 65 in the mandrel 20, a tapered hole 67 extends through the mandrel transversely with respect to the axis of the mandrel and spaced outwardly from bore 68 which extends axially through the mandrel. The axis of the plug-receiving hole 67 thus lies along a chord drawn with respect to the circular periphery of the mandrel. To afford a press fit for the plug 65, the plug-receiving hole 67 has a complementary taper. The hole 67 is, moreover, sized to receive the plug within the circular profile of the mandrel. Rotation of the plug 65 relative to the mandrel is facilitated by provision of a slot 69 in the large end of the plug for receiving the blade of a screwdriver (not shown).

While in present commercial practice, coil assemblies are constructed which, when isolated from conductive bodies, produce a minimum residual signal, consistent attainment of the advantages of the present invention is ensured, as described above, by designing the coil assembly to have a small residual bias signal of prescribed value and given polarity. While such a small residual bias signal may be obtained, for example, by properly selecting the resistance of conductors forming the coils and particularly the compensating coil 25, the dual purpose single-turn loop 61 is conveniently employed. Assuming, for example, that the coil assembly and loop 61 are arranged, absent the adjusting element 27, to produce a residual conductive signal component of positive polarity, the response curve 70 (FIG. 5) may be taken as typically representative of the effect upon the conductive signal component which may be achieved with the adjusting element.

The response curve 70 is plotted to represent the output conductivity signal in millimhos as a function of placement of the adjusting coil 62 (taken in its maximum effective position) relative to the transmitter, receiver and compensating coils 21, 23 and 25. As indicated opposite the schematic representation of the coil 62 on FIG. 5, the response represented by the corresponding portion 71 of the curve 70 is that obtained when the coil is threaded by a maximum of flux derived from the transmitter coil 21. Since the flux from the transmitter coil 21 departs from the common axis of the coils, the maximum effective position of the adjusting coil 62 is generally with its axis inclined to the common axis of the transmitter and receiver coils, rather than with a parallel relationship between the axes. Conveniently, however, the plug 65 is received in the hole 67 with freedom to rotate through a complete circle, so that no prior determination of the limits between maximum and minimum effective positions need be incorporated in the construction. It may further be noted that the coil 62 is located in the vicinity of the compensating coil 25, because in this vicinity the response to the adjusting coil is sufficiently sensitive to the rotation of the coil, not too sensitive to the longitudinal position of the coil, and of the correct polarity for balancing out the residual signal, including the constant component produced by loop 61.

In an exemplary operation, the induction logging sonde 10 is moved through the borehole past formations to be investigated, while the record of recorder 33 is correspondingly advanced. Oscillator 36 is energized from the power supply to pass alternating current of, say, 20 kilocycles through the transmitter coil 21 and the oppositely wound focussing coil 22 to establish a resultant electromagnetic field in the regions surrounding such coils. The generation of this electromagnetic field induces currents to flow in circular paths coaxially with the coil assembly and borehole and lying in the formations surrounding the borehole. Since the induction logging sonde is in motion, it will be appreciated that the circular current paths are established in successive formations along the borehole so that corresponding, successive indications of formation conductivity may be secured.

The induced current following the circular paths create a secondary magnetic field which, in turn, induces an electromotive force in the receiver coil array in phase with the energizing current in the transmitter coil, ignoring a reversal to the polarity which may be corrected by suitable coil connections. Since the intensity of the induced formation currents depends upon the product of the transmitter current and the conductivity of the adjacent formations, the transmitter current may be maintained at a constant value to render the inphase component of the potential induced in the receiver coil array directly representative of the formation conductivity. The significance of the conductivity values characterized by this inphase or conductive component depends upon the effective spacing of the transmitter and receiver coils and the focussing effect achieved by the focussing coils 22 and 24, and the compensating coil 25.

At the same time, a reactive component of electromotive force is induced in the receiver coil array which is minimized to a large extent by the reduction in mutual inductance afforded by the compensating coil 25. Where the effective spacing between the transmitter and receiver coils is quite large, for example, 40 inches or greater, the reactive or phase quadrature component may under some conditions be adequately rejected by the phase sensitive detector 41. For shorter spacings on the other hand, a further rejection of the phase quadrature component may be desirable.

Considering the reactive component of the signal induced in the receiver coil array, this component is amplified in the signal amplifier 40, shifted in phase by 90° for an inphase relation with the reference signal derived from the reference amplifier 42, and applied to the phase sensitive detector 54. At the output terminals of detector 54, D.C. biasing signals are derived, balanced with a respect to ground, which are applied to the respective control inputs of the variometer circuit 50. The bias signals determine the amount of the degenerative signal introduced at the secondary winding of transformer 52 having a phase and frequency to reduce the magnitude of the reactive component derived from the receiver coil array. Proper design of the phase correcting network 51 ensures that the degenerative signal is purely reactive and introduces no spurious conductive component into the measuring circuit.

The conductive component induced in the receiver coil array is amplified in signal amplifier 40 and applied directly to the phase sensitive detecor 41 to provide a D.C. output corresponding linearly with the conductive component. This output signal is normally of one polarity and varies in magnitude in accordance with the apparent conductivity of the formations undergoing investigation, the contribution of various portions of the adjacent formations being determined by the vertical and radial focussing characteristics of the coil assembly.

At the surface, the output signal is applied to the recorder 33 to obtain a record indicative of the variations of formation conductivity and resistivity as a function of the level of the formations in the borehole.

In order that the indications of formation conductivity which are obtained may represent not only the relative variations of conductivity from one formation to the next but also the absolute value of measured conductivity for each formation investigated, it is necessary that the coil assembly be calibrated not only as to sensitivity over a range of conductivity values but also for a correct zero value. While the sensitivity of the coil assembly is conveniently checked by simulating a formation of standard conductivity with a test coil positioned concentrically about the coil assembly, determination of correct zero adjustment requires that the coil assembly be spaced apart from conductive bodies. Thus, the coil assembly may be supported well above the earth's surface so as to be surrounded only by air.

In accordance with the present invention, the coil assembly with the adjusting element removed would, in this zero test position, produce a small residual signal equivalent, say, to a positive 8 millimhos of formation conductivity. Absent the adjusting element, then, measure signals derived from the induction logging tool would represent values of formation conductivity consistently higher than the true values by the amount of the residual signal. Heretofore, a small potential has been introduced from a standard cell in opposition to any residual signal present but proper cancellation of the residual signal required that an operator adjust the introduced potential in accordance with data previously obtained from the zero test of the particular coil assembly being used. Since different coil assemblies may be used from time to time and the correct manual adjustment may therefore be in error, either as to magnitude or polarity, the adjusting means of the present invention is arranged to balance out the residual signal at its source, namely, within the coil assembly itself. Thus, in testing the zeroing of the coil assembly when spaced apart from conductive media, the plug 65 carrying the adjusting coil 62 may be rotated to a position where substantially a zero output signal is derived from the phase sensitive detector 41, corresponding to a zero conductive component induced in the receiver coil array. To ensure that the residual signal may be brought to zero by an adjustment of the rotational position of the coil 62, the magnitude of the residual signal attributable to the coil assembly and loop 61 is, say, +8 mmhos while the signal resulting from the adjusting coil may be varied from zero in its minimum effective position to —16 mmhos in its maximum effective position. It will be appreciated then that the component of the residual signal attributable to the adjusting coil is conveniently of variable magnitude over a range exceeding the magnitude of the residual signal but always of the same polarity opposite to the polarity of the biased component of the residual signal.

When the setting of the adjusting coil results in substantially a zero residual signal, the coil assembly is ready for use. After a number of operations have been performed using a given coil assembly, it may be desirable to recheck the zero setting. Since the correction afforded by the rotation of the adjusting coil has only a limited range, the adjusting coil may serve the further purpose of establishing limits by which the serviceability of a given coil assembly may be determined. Thus, if the residual signal of a given coil assembly cannot be restored to zero after undergoing severe operating conditions, a need for repair may be indicated.

The adjusting element 27 thus affords an extremely simple, reliable and inexpensive arrangement for setting the zero of the coil assembly. The taper of the plug 65 allows both rotation and secure retention in the mandrel, while the plug may be devoid of any metal or conductive material except that which is deliberately incorporated to afford the desired adjustment. Both factory and field adjustments may then be readily accomplished.

It will be appreciated, however, that the form and arrangement of the adjusting element is subject to considerable variation within the purview of the invention. For example, the adjusting element might be arranged for zero adjustment of the reactive rather than the conductive component of the receiver signal. The high resistance coil 62 might then be replaced with a low resistance coil which would be primarily inductive or with a suitably shaped piece of powdered iron or like inductive element.

Similarly, the coil assembly may have a variety of forms including the employment of fewer or greater numbers of coils, or multiple receiver-transmitter coil spacings. If desired, the entire coil assembly may be enclosed within a rigid sleeve of non-magnetic, non-conductive material, provision being made for access to the adjusting element. In addition, a variety of circuits may be employed for energizing the receiver coil array and selectively responding to a desired component of the signal picked up by the transmitter coil. For example, the circuit described in N. A. Schuster Patent No. 2,723,375, issued November 8, 1955, for "Induction Logging Apparatus" may be employed whereby the conductive component picked up by the transmitter coil determines the frequency deviation of a signal transmitted to the surface.

Accordingly, the invention is not to be limited to the embodiment illustrated and described but is of a scope defined in the appended claims.

I claim:

1. In apparatus for investigating an electrical property of earth formations traversed by a borehole, the combination comprising a transmitter coil and a receiver coil arranged for longitudinal movement through a borehole, means for energizing said transmitter coil to induce in said receiver coil a potential having a component dependent upon the conductivity of adjacent formations and a residual component independent of formation conductivity, means located in and exposed to the electromagnetic flux field of the transmitter coil and supported in adjustable inductive coupling relation to said receiver coil for diminishing said residual component, and means responsive to said components for providing indications varying as a function of formation conductivity.

2. In apparatus for investigating an electrical property of earth formations taversed by a borehole, the combination comprising a transmitter coil and a receiver coil fixedly spaced for longitudinal movement through a borehole, means for energizing said transmitter coil to induce in said receiver coil a potential having a component dependent upon the conductivity of adjacent formations and a residual component independent of formation conductivity, means providing a closed conductive path located in and exposed to the electromagnetic flux field of the transmitter coil and supported in adjustable inductive coupling relation to said transmitter and receiver coils for diminishing said residual component substantially to zero, and phase sensitive means responsive to said components for providing a signal at the surface varying as a function of formation conductivity.

3. In apparatus for investigating an electrical property of earth formations traversed by a borehole, the combination comprising a transmitter coil and a receiver coil fixedly spaced for longitudinal movement through a borehole, means for passing sinusoidal current through said transmitter coil to induce in said receiver coil a potential having a conductive component and a residual component in phase with said current and a reactive component in phase quadrature with respect to said current, a compensating coil spaced intermediate said transmitter and receiver coils and connected in series opposition with one of said coils for diminishing said quadrature component, means providing a closed conductive path located in and exposed to the electromagnetic flux field of the transmitter coil and supported in adjustable inductive coupling relation to said transmitter and receiver coils for diminishing said residual component, and means selectively responsive to said in-phase components for providing a signal at the surface varying as a function of formation conductivity.

4. In apparatus for investigating an electrical property of earth formations traversed by a borehole, the combination comprising an elongated mandrel, a transmitter coil, a receiver coil and a compensating coil therebetween wound about said mandrel for longitudinal movement through a borehole, means for passing current through said transmitter coil to induce in said receiver coil a potential having a conductive component and a residual component in-phase with said current, said residual component being independent of formation conductivity, and a reactive component in phase quadrature with said current, said compensating coil being connected in series opposition with one of said transmitter and receiver coils for diminishing said reactive component means providing a closed conductive path located in and exposed to the electromagnetic flux field of the transmitter coil and supported in adjustable inductive coupling relation to said transmitter and receiver coils for diminishing said residual component, and means selectively responsive to said in-phase components for providing a signal at the surface varying as a function of formation conductivity.

5. In apparatus for investigating an electrical property of earth formations traversed by a borehole, the combination comprising a transmitter coil and a receiver coil fixedly spaced for longitudinal movement through a borehole, means for energizing said transmitter coil to induce in said receiver coil a potential having a component dependent upon the conductivity of adjacent formations and a residual component independent of formation conductivity, an adjusting coil located in and exposed to the electromagnetic flux field of the transmitter coil and mounted rotatively with respect to said transmitter and receiver coils for adjustable inductive coupling with said transmitter and receiver coils to diminish said residual component as a function of its rotational position, and means responsive to said components for providing a signal at the surface varying as a function of formation conductivity.

6. In apparatus for investigating an electrical property of earth formations traversed by a borehole, the combination comprising a transmitter coil and a receiver coil fixedly spaced for longitudinal movement through a borehole, means for energizing said transmitter coil to induce in said receiver coil a potential having a component dependent upon the conductivity of adjacent formations and a residual component independent of formation conductivity, a closed-loop adjusting coil located in and exposed to the electromagnetic flux field of the transmitter coil and adjustably mounted between said transmitter and receiver coils in inductive coupling relation with said transmitter and receiver coils for diminishing said residual component, and means selectively responsive to said components for providing a signal at the surface varying as a function of formation conductivity.

7. In apparatus for investigating an electrical property of earth formations traversed by a borehole, the combination comprising an elongated mandrel, a plurality of coils wound thereabout in spaced apart relation including a transmitter coil and a receiver coil, means for passing a sinusoidal current of given phase through said transmitter coil to induce in said receiver coil a potential having an in-phase component and a phase quadrature component said in-phase component including a variable signal dependent upon the conductivity of adjacent formations and a residual signal of given polarity with respect to said variable signal, means providing a closed current path located in and exposed to the electromagnetic flux field of the transmitter coil and supported in adjustable inductive coupling relation to said transmitter coil for inducing in said receiver and receiver coils an additional in-phase component of opposite polarity with respect to said residual signal, and means selectively responsive to said in-phase components for providing a signal at the surface varying as a function of formation conductivity.

8. In apparatus for investigating an electrical property of earth formations traversed by a borehole, the combination comprising a mandrel, a transmitter coil, a receiver coil, and a compensating coil wound about said mandrel in spaced apart relation for longitudinal movement through a borehole, said compensating coil being connected in series opposition with one of said transmitter and receiver coils, means for energizing said transmitter coil to induce in said receiver coil a potential having a component dependent upon the conductivity of adjacent formations and a residual component independent of formation conductivity, a closed-loop high resistance coil mounted on said mandrel intermediate said transmitter and said compensating coils for rotation about an axis transverse to the axis of said mandrel to diminish said residual component, and means responsive to said conductive component and said diminished residual component for providing a signal at the surface varying as a function of formation conductivity.

9. In apparatus for investigating an electrical property of earth formations traversed by a borehole, the combination comprising a mandrel, a transmitter coil and a receiver coil wound about said mandrel and longitudinally spaced therealong for movement through a borehole, means for energizing said transmitter coil to induce in said receiver coil a potential having a component dependent upon the conductivity of adjacent formations and a residual component independent of formation conductivity, a tapered plug composed of non-conductive, non-magnetic material received in a tapered hole extending transversely through said mandrel intermediate said coils, means rotatably carried by said plug and having a variable inductive coupling with said coils to diminish said residual component, and means responsive to said components for providing a signal at the surface varying as a function of formation conductivity.

10. In apparatus for investigating an electrical property of earth formations traversed by a borehole, the combination as defined in claim 9, wherein said tapered hole is offset from the axis of said mandrel, there being a compensating coil wound about said mandrel adjacent said tapered hole and connected in series opposition with one of said transmitter and receiver coils.

11. In apparatus for investigating an electrical property of earth formations traversed by a borehole, the combination, as defined in claim 9, further comprising a closed conductive loop wound about said mandrel and positioned therealong to introduce a fixed residual potential component opposite in polarity to that introduced by said rotatably carried means.

12. In apparatus for investigating an electrical property of earth formations traversed by a borehole, the combination, as defined in claim 11, wherein said loop has a resistance smaller than its inductance at the frequency of said energizing means whereby said fixed residual potential component changes with increasing temperature in the borehole to compensate for a drift with temperature of the potential component which is dependent upon formation conductivity.

13. In apparatus for investigating an electrical property of earth formations traversed by a borehole, the combination as defined in claim 9 wherein said rotatably-carried means comprises a closed-loop coil.

14. In apparatus for investigating an electrical property of earth formations traversed by a borehole, the combination comprising a transmitter coil and a receiver coil arranged for longitudinal movement through a borehole, means for energizing said transmitter coil to induce in said receiver coil a potential having a component dependent upon the conductivity of adjacent formations and a residual component independent of formation conductivity, adjustable means located in and exposed to the electromagnetic flux field of the transmitter coil and inductively coupled to said receiver coil for introducing therein an adjustable component for diminishing said residual component, and means responsive to said components for providing indications varying as a function of formation conductivity.

15. In apparatus for investigating an electrical property of earth formations traversed by a borehole, the combination comprising a transmitter coil and a receiver coil arranged for longitudinal movement through a borehole, means for energizing said transmitter coil to induce in said receiver coil a potential having a component dependent upon the conductivity of adjacent formations and a residual component independent of formation conductivity, means located in and exposed to the electromagnetic flux field of the transmitter coil and supported in adjustable inductive coupling relation to said transmitter and receiver coils for diminishing said residual component, and means responsive to said components for providing indications varying as a function of formation conductivity.

16. In apparatus for investigating an electrical property of earth formations traversed by a borehole, the combination comprising a mandrel, a transmitter coil and a receiver coil wound about said mandrel in spaced apart relation for longitudinal movement through a borehole, means for energizing said transmitter coil to induce in said receiver coil a potential having a component dependent upon the conductivity of adjacent formations and a residual component independent of formation conductivity, a closed-loop coil mounted on said mandrel intermediate said transmitter and said receiver coils for rotation about an axis transverse to the axis of said mandrel to diminish said residual component, and means responsive to said conductive component and said diminished residual component for providing a signal varying as a function of formation conductivity.

17. In apparatus for investigating an electrical property of earth formations traversed by a borehole, the combination comprising a mandrel, a transmitter coil, a receiver coil, and a compensating coil wound about said mandrel in spaced apart relation for longitudinal movement through a borehole, said compensating coil being connected in series opposition with one of said transmitter and receiver coils, means for energizing said transmitter coil to induce in said receiver coil a potential having a component dependent upon the conductivity of adjacent formations and a residual component independent of formation conductivity, a closed-loop coil mounted on said mandrel intermediate said transmitter and said compensating coils for rotation about an axis transverse to the axis of said mandrel to diminish said residual component, and means responsive to said conductive component and said diminished residual component for providing a signal varying as a function of formation conductivity.

18. In apparatus for investigating an electrical property of earth formations traversed by a borehole, the combination comprising a transmitter coil and a receiver coil arranged for longitudinal movement through a borehole, means for energizing said transmitter coil to induce in said receiver coil a signal component representative of the conductivity of adjacent earth formations, said signal component tending to drift as the temperature in the borehole changes, a closed conductive loop located in and exposed to the electromagnetic flux field of the transmitter coil and positioned adjacent to the transmitter and receiver coils for introducing into the receiver coil a signal component for compensating for said drift in the conductivity-representative component, and means responsive to said signal components for providing indications varying as a function of formation conductivity.

19. In apparatus for investigating an electrical property of earth formations traversed by a borehole, the combination comprising a mandrel, a transmitter coil and a receiver coil wound about said mandrel in spaced apart relation for longitudinal movement through a borehole, means for energizing said transmitter coil to induce in said receiver coil a signal component representative of the conductivity of adjacent earth formations, said signal component tending to drift as the temperature in the borehole changes, a closed conductive loop having no external circuit connections and wound around said mandrel and positioned therealong for introducing into the receiver coil a signal component for compensating for said drift in the conductivity-representative component, and means responsive to said signal components for providing indications varying as a function of formation conductivity.

References Cited in the file of this patent

UNITED STATES PATENTS

| | | |
|---|---|---|
| 2,321,356 | Berman | June 8, 1943 |
| 2,438,197 | Wheeler | Mar. 23, 1948 |
| 2,447,316 | Curtis | Aug. 17, 1948 |
| 2,582,314 | Doll | Jan. 15, 1952 |
| 2,582,315 | Doll | Jan. 15, 1952 |
| 2,598,252 | Gossick | May 17, 1952 |
| 2,723,375 | Schuster | Nov. 8, 1955 |
| 2,788,483 | Doll | Apr. 9, 1957 |